(12) United States Patent
Gao et al.

(10) Patent No.: US 12,386,902 B2
(45) Date of Patent: Aug. 12, 2025

(54) METHOD AND APPARATUS FOR KNOWLEDGE GRAPH CONSTRUCTION, STORAGE MEDIUM, AND ELECTRONIC DEVICE

(71) Applicant: Lemon Inc., Grand Cayman (KY)

(72) Inventors: Yuan Gao, Los Angeles, CA (US); Hongyu Xiong, Los Angeles, CA (US); Yiqi Feng, Los Angeles, CA (US); Bin Liu, Los Angeles, CA (US); Han Wang, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 18/573,944

(22) PCT Filed: Aug. 12, 2022

(86) PCT No.: PCT/SG2022/050575
§ 371 (c)(1),
(2) Date: Dec. 22, 2023

(87) PCT Pub. No.: WO2023/018379
PCT Pub. Date: Feb. 16, 2023

(65) Prior Publication Data
US 2024/0330373 A1 Oct. 3, 2024

(51) Int. Cl.
*G06F 16/90* (2019.01)
*G06F 16/33* (2025.01)
(Continued)

(52) U.S. Cl.
CPC .............. *G06F 16/90344* (2019.01)

(58) Field of Classification Search
CPC ................................. G06F 16/9034
(Continued)

(56) References Cited

U.S. PATENT DOCUMENTS 7,925,620 B1 * 4/2011 Yoon ................ G06F 16/90
707/705
11,238,468 B1 * 2/2022 Buist, III ............ G06F 16/9024
(Continued)

FOREIGN PATENT DOCUMENTS

CN 103955531 A 7/2014
CN 103955531 B * 6/2017 ....... G06F 17/30864
(Continued)

OTHER PUBLICATIONS

Hogan, A. et al, Knowledge Graphs. ACM Computing Surveys, Jul. 2, 2021, vol. 54, No. 4, pp. 1-37, [searched on Jan. 26, 2023]<DOI: 10.1145/3447772>, entire document.
(Continued)

*Primary Examiner* — Son T Hoang
(74) *Attorney, Agent, or Firm* — Faegre Drinker Biddle & Reath LLP (57) ABSTRACT

The disclosure relates to a method and apparatus for knowledge graph construction, a storage medium, and an electronic device. The method comprises: obtaining a target entity identifier and determining an industry type label corresponding to the target entity identifier; determining a target industry attribute table based on a predetermined correspondence among the industry type label, an industry type, and an industry attribute table; obtaining target attribute values of the target entity identifier from a public database based on respective target attribute names in the target industry attribute table, to obtain a target attribute of the target entity identifier, wherein the target attribute characterizes a key-value pair consisting of the target attribute name and the target attribute value; and constructing a knowledge graph based on an entity characterized by the target entity identifier, the industry type label, and the target attribute.

17 Claims, 3 Drawing Sheets

(51) Int. Cl.
*G06F 16/35* (2025.01)
*G06F 16/36* (2019.01)
*G06F 16/903* (2019.01)

(58) Field of Classification Search
USPC .......................................................... 707/722
See application file for complete search history.

(56) References Cited

U.S. PATENT DOCUMENTS

| 2009/0012937 A1* | 1/2009 | Lee ..................... G06F 16/9535 |
| 2016/0269473 A1* | 9/2016 | Bhogal ................... G06F 16/90 |
| 2023/0162005 A1* | 5/2023 | Cheng ................. G06F 16/9035 |

FOREIGN PATENT DOCUMENTS

| CN | 110516047 A | 11/2019 |
| CN | 111061841 A | 4/2020 |
| CN | 111368094 A | 7/2020 |
| CN | 111414491 A | 7/2020 |
| CN | 111428055 A | 7/2020 |
| CN | 111753100 A | 10/2020 |
| CN | 111930856 A | 11/2020 |
| CN | 112199511 A | 1/2021 |
| CN | 112650855 A | 4/2021 |
| CN | 113157947 A | 7/2021 |
| CN | 112199511 B * | 7/2022 | ........... G06F 16/353 |

OTHER PUBLICATIONS

Notification of registration procedures received from Chinese patent application No. 202110926830.7 mailed on Mar. 26, 2023, 7 pages (2 pages English Translation and 5 pages Original Copy).

Xuewei, "Research on Archives Knowledge Graph Construction Technology", China Electronics Technology, Apr. 11, 2019, pp. 1-65.

* cited by examiner

METHOD AND APPARATUS FOR KNOWLEDGE GRAPH CONSTRUCTION, STORAGE MEDIUM, AND ELECTRONIC DEVICE

CROSS-REFERENCE TO RELATED APPLICATION(S)

This application is based on and claims priority to Chinese Patent Application No. 202110926830.7, filed on Aug. 12, 2021, and entitled "METHOD AND APPARATUS FOR KNOWLEDGE GRAPH CONSTRUCTION, STORAGE MEDIUM, AND ELECTRONIC DEVICE", the entirety of which is hereby incorporated by reference.

FIELD

The present disclosure relates to the field of knowledge graph technology, and in particular, to a method and apparatus for knowledge graph construction, a storage medium, and an electronic device.

BACKGROUND

A knowledge graph is a structured semantic knowledge base for describing concepts and their relations in the physical world in symbolic form, whose basic unit of composition is triple. Specifically, the triple can be interpreted as (entity, relation, entity). If an entity is considered as a node and a relation (including attributes, classes, and the like) is considered as an edge, entities are linked to each other through the relations, to construct a mesh knowledge structure. In such a way, a knowledge base that contains a large number of triples becomes a huge knowledge graph.

In related technologies, a well-constructed knowledge graph of the healthcare system can be used to describe the relations between patients and doctors. It can be seen that all kinds of current knowledge graphs are used to describe the relations between various entities in a certain domain.

SUMMARY

This section is provided to present to introduce the concepts of the present disclosure in brief, which will be described in detail later in the detailed description section. This section is neither intended to identify key or essential features of the technical solution of the claimed subject matter, nor is it intended to limit the scope of the technical solution of the claimed subject matter.

In a first aspect, the present disclosure provides a method for knowledge graph construction, comprising:
  obtaining a target entity identifier and determining an industry type label corresponding to the target entity identifier;
  determining a target industry attribute table based on a predetermined correspondence among the industry type label, an industry type, and an industry attribute table;
  obtaining target attribute values of the target entity identifier from a public database based on respective target attribute names in the target industry attribute table, to obtain a target attribute of the target entity identifier, wherein the target attribute characterizes a key-value pair consisting of the target attribute name and the target attribute value; and
  constructing a knowledge graph based on an entity characterized by the target entity identifier, the industry type label, and the target attribute.

In a second aspect, the present disclosure provides an apparatus for knowledge graph construction, comprising:
  a first obtaining module configured to obtain a target entity identifier and determine an industry type label corresponding to the target entity identifier;
  a determination module configured to determine a target industry attribute table based on a predetermined correspondence among the industry type label, an industry type, and an industry attribute table;
  a second obtaining module configured to obtain target attribute values of the target entity identifier from a public database based on respective target attribute names in the target industry attribute table, to obtain a target attribute of the target entity identifier, wherein the target attribute characterizes a key-value pair consisting of the target attribute name and the target attribute value; and
  a construction module configured to construct a knowledge graph based on an entity characterized by the target entity identifier, the industry type label, and the target attribute.

In a third aspect, the present disclosure provides a computer-readable medium having a computer program stored thereon which, when executed by a processing device, performs the steps of the method according to any of embodiments of the first aspect.

In a fourth aspect, the present disclosure provides an electronic device, comprising:
  a storage device with a computer program stored thereon; and
  a processing device configured to execute the computer program in the storage device to perform the steps of the method according to any of embodiments of the first aspect.

With the above technical solution, at least the following technical effects can be achieved:

A target entity identifier is obtained and an industry type label corresponding to the target entity identifier is determined. A target industry attribute table is determined based on a predetermined correspondence among the industry type label, an industry type, and an industry attribute table. Target attribute values of the target entity identifier are obtained from a public database based on respective target attribute names in the target industry attribute table, to obtain a target attribute of the target entity identifier. A knowledge graph is constructed based on an entity characterized by the target entity identifier, the industry type label of the target entity identifier, and the target attribute of the target entity identifier. The method according to the present disclosure may be adopted in such a manner to mine different entities within a plurality of domains (industries) and construct a cross-industry knowledge graph to establish a relation between entities in different industries.

Other features and advantages of the present disclosure will be described in detail in the following detailed description.

BRIEF DESCRIPTION OF THE DRAWINGS

The foregoing and other features, advantages, and aspects of embodiments of the present disclosure will become more apparent in conjunction with the accompanying drawings and with reference to the following detailed description. Throughout the accompanying drawings, the same or similar accompanying markings indicate the same or similar elements. It should be understood that the accompanying drawings are schematic and that the parts and elements are not necessarily drawn to scale. In the accompanying drawings.

DETAILED DESCRIPTION

Embodiments of the present disclosure will be described in greater detail below with reference to the accompanying drawings. Although certain embodiments of the present disclosure are shown in the accompanying drawings, it should be understood, however, that the present disclosure may be realized in various forms and should not be construed as being limited to the embodiments set forth herein, but rather are provided for a more thorough and complete understanding of the present disclosure. It should be understood that the accompanying drawings and embodiments of the present disclosure are for example purposes only and are not intended to limit the scope of protection of the present disclosure.

It should be understood that the various steps documented in the method implementations of the present disclosure may be performed in a different order, and/or in parallel. Furthermore, the method embodiments may include additional steps and/or omit execution of the illustrated steps. The scope of the present disclosure is not limited in this regard.

As used herein, the term "including" and its variations are open-ended, i.e., "including but not limited to". The term "based on" means "based at least in part on". The term "one embodiment" means "at least one embodiment"; the term "another embodiment" means "at least one additional embodiment"; and the term "some embodiments" means "at least some embodiments". Relevant definitions of other terms will be given in the description below.

It should be noted that the concepts of "first", "second" and the like mentioned in this disclosure are only used to distinguish between different devices, modules or units, and are not used to define the order or interdependence of the functions performed by these devices, modules or units.

It should be noted that the modifications of "one" and "more than one" referred to in the present disclosure are schematic rather than limiting, and should be understood by those skilled in the art to mean "one or more" unless the context clearly indicates otherwise.

The names of the messages or information interacted between the plurality of devices of the presently disclosed embodiments are used for illustrative purposes only and are not intended to place limitations on the scope of those messages or information.

Before describing the detailed embodiments of the technical solutions of the present disclosure, it is to be declared that the information used in the present disclosure has been obtained for use under lawful circumstances.

As described in the background, traditional knowledge graph construction usually focuses only on the relations between different entities in the same domain. For example, a well-constructed knowledge graph of a healthcare system can be used to describe the relations between patients and doctors, and a well-constructed knowledge graph of fresh food can be used to describe the relations between various types of fresh food.

However, with the complexity and diversification of application scenarios, the knowledge graph of a single domain cannot meet the demand of multi-scenario applications. For example, in the recommendation system, when a user watches a superhero movie A produced by Company M, other superhero movies of company M, such as movie B, may be recommended to the user based on the traditional film and television knowledge graph. When the user wants to buy costumes and cartoon character toys with features of movie A, the traditional film and television knowledge graph cannot provide the user with a recommendation for the costumes and toys based on the film and television knowledge graph, because it does not possess the capability of cross-industry entities description.

In view of the foregoing, to meet the requirements that when a user watches Company M's superhero movie A, and an e-commerce company wants to promote clothes with Company M's features on the platform, relevant objects with Company M's features can be recommended to that user. The embodiments of the present disclosure provide a method for knowledge graph construction and apparatus, a storage medium, and an electronic device for constructing a cross-industry and cross-domain knowledge graph, which, in addition to mining relations between entities within the same industry, further mines relations between entities in different industries.

Figure 1:
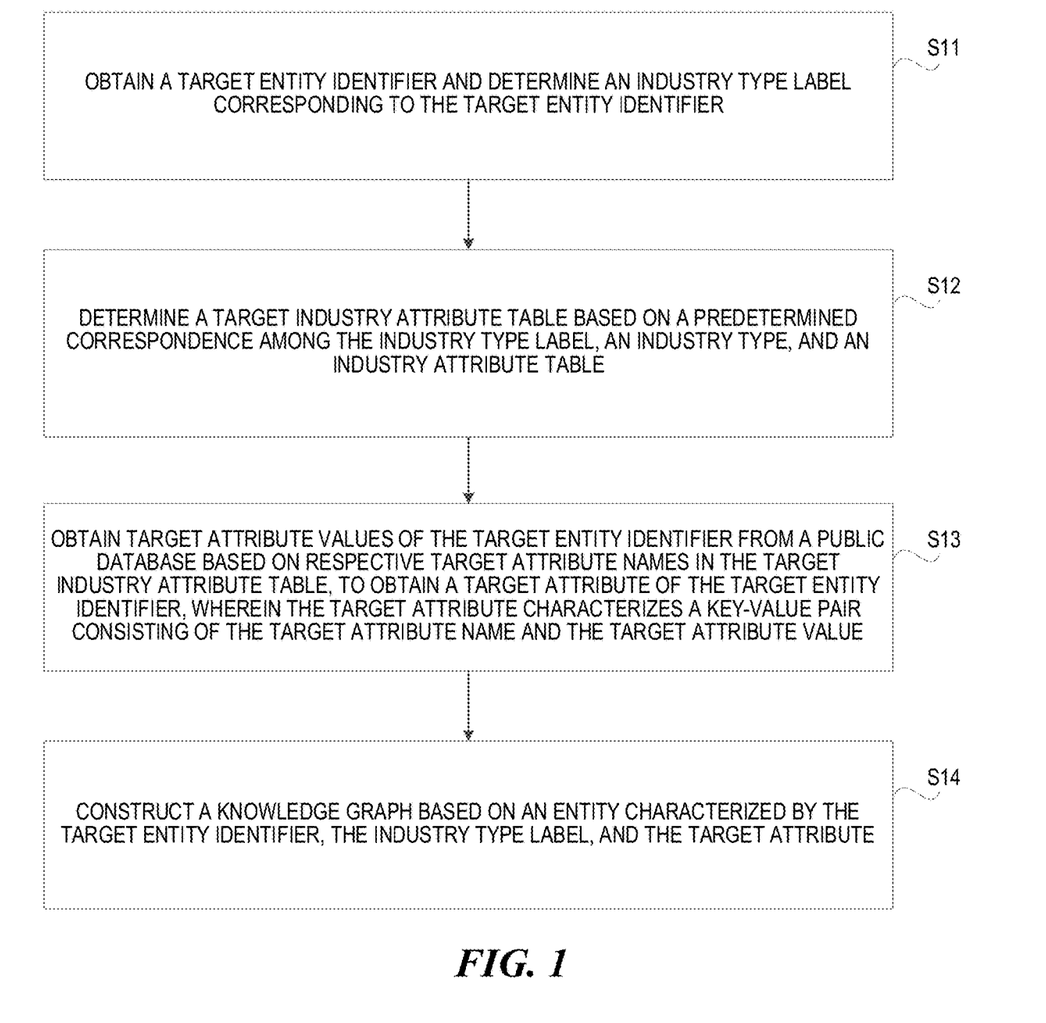
FIG. 1 illustrates a flowchart of a method for knowledge graph construction according to an example embodiment of the present disclosure.

FIG. 1 is a flowchart of a method for knowledge graph construction according to an example embodiment of the present disclosure. As shown in FIG. 1, the method includes the following steps.

S11. Obtain a target entity identifier is obtained and determine an industry type label corresponding to the target entity identifier.

The target entity identifier(s) may be obtained in order from a predetermined set of entities, be given by a user, may be a new entity monitored by an application platform (e.g., a newly uploaded video entity by a user, new entity text that is involved in the text of a user's comment, etc.) from the application platform.

The target entity identifier is configured to characterize an entity. The target entity identifier may be a QID of the entity, an abbreviation of the Chinese name of the entity, an abbreviation of the English name of the entity, a predetermined code of the entity, and so forth, which are not limited in the present disclosure.

In an applicable embodiment, determining the industry type label corresponding to the target entity identifier includes the following steps:

obtaining retrieved information related to the target entity identifier by searching for the target entity identifier through a search engine; extracting a keyword from the retrieved information; and obtaining the industry type label for the target entity identifier by inputting a feature representation of the keyword into an industry classification model.

As an example, obtaining the retrieved information related to the target entity identifier by searching for the target entity identifier through the search engine includes: constructing an access link to a target website based on the target entity identifier; and obtaining a webpage corresponding to the access link to the target website, and extracting the retrieved information from the webpage.

For example, assuming that the target entity identifier is Movie XX, an access link to an encyclopedia-type website A constructed based on the target entity identifier "Movie XX" may be "https://aa.bbb.cc/movie xx". A corresponding web page may be obtained through the access link to this encyclopedia-type website A. Since the web page includes retrieved information of the target entity identifier Movie XX, the retrieved information of "Movie XX" can be extracted from the web page.

As an example, extracting the keyword from the retrieved information includes: extracting text with each href attribute label from the retrieved information and removing a stop word from the extracted text with the respective href attribute label to obtain the keyword.

The href attribute label is an attribute label of an <a> label that specifies a URL of a hyperlink destination. It can be understood that if a user selects content in the <a> label, then a browser will automatically try to retrieve and display a document represented by the URL specified by the href attribute, or perform a list of JavaScript expressions, methods, and functions.

A stop word is a certain word or phrase that is automatically filtered out before or after processing natural language data (or text) in order to save storage space and improve searching efficiency during information retrieval. The stop word can be configured in advance.

For example, search terms (or keywords) corresponding to the target entity identifier Movie XX may include one or more of the following: film, IMAX, theaters, Academy Awards, and tent-pole.

As another example, extracting the keyword from the retrieved information may include performing processing on the retrieved information to extract all nouns therein as keywords. As a further example, extracting the keyword from the retrieved information may also include inputting the retrieved information into a trained neural network to obtain one or more keywords output by the neural network.

After the keywords of the target entity identifier are extracted, feature representations of these keywords are input into an industry classification model to obtain the industry type label.

In a particular implementation, the keywords may be input into a pre-trained word embedding model, and the word embedding model performs average-pooling on these keywords to obtain feature representations (embeddings) of the keywords. Then the feature representations of the keywords are input into a KNN or Bayesian industry classifier for classification, so as to obtain the industry type label. For example, the industry type label of the target entity identifier "Movie XX" is the film industry (film).

In an applicable embodiment, the keywords of the target entity identifier may also by identified using topic modeling, in order to obtain the industry type label of the target entity identifier.

By way of example, the industry types include a restaurant industry, a film industry, an apparel industry, and the like. The specific forms of the industry type labels are not limited in the present disclosure.

S12. Determine a target industry attribute table based on a predetermined correspondence among the industry type label, an industry type, and an industry attribute table.

It is possible to predefine corresponding industry attribute tables for various industry types. In an applicable implementation, an industry attribute table (schema) that has been organized in various public databases is obtained as the industry attribute table in the present disclosure. In another applicable implementation, all attributes of typical examples of entities in a corresponding industry are obtained to construct an industry attribute table for that industry. In yet another applicable implementation, industry attribute tables corresponding to various industry types may be manually designed empirically.

As an example, an industry attribute table corresponding to the film and television industry may be as shown in Table 1.

TABLE 1

| Movie title (entity) | Directed by | Form of writing | Actor | Produced by | Time | Region |
|---|---|---|---|---|---|---|

S13. Obtain target attribute values of the target entity identifier from a public database based on respective target attribute names in the target industry attribute table, to obtain a target attribute of the target entity identifier, in which the target attribute characterizes a key-value pair consisting of the target attribute name and the target attribute value.

After the target industry attribute table corresponding to the target entity identifier is determined in step S12 above, target attribute values corresponding to respective target attribute names in the target industry attribute table, are obtained from a public database to obtain a target attribute of the target entity identifier.

As an example, taking the target entity identifier "Movie XX" and the industry attribute table shown in Table 1 as an example, the target attribute of the target entity identifier Movie XX may be obtained as shown in Table 2.

TABLE 2

| Movie Title | Directed by | Form of writing | Actor | Produced by | Time | Region |
|---|---|---|---|---|---|---|
| Tenet | Christopher Nolan | Action thriller | John David Washington, Robert Pattinson, Elizabeth Debicki, Michael Caine, Kenneth Branagh | Warner Bros. Pictures, USA | 2020 | United States of America |

It is noted that the target attribute names and the target attribute values corresponding to the target attribute names in Table 2 may be characterized by predetermined code IDs.

In step S14, Construct a knowledge graph based on an entity characterized by the target entity identifier, the industry type label, and the target attribute.

Assuming that the target entity identifier is Movie XX, an entity characterized by the target entity identifier "Movie XX" is the movie "Movie XX" or the movie name in other language.

After the industry type label and the target attribute of the target entity identifier are obtained, a knowledge graph may be constructed.

In an applicable implementation, the industry type label of the entity may be used as an industry attribute of the entity.

In the above method according to the present disclosure, a target entity identifier is obtained and an industry type label corresponding to the target entity identifier is determined. A target industry attribute table is determined based on a predetermined correspondence among the industry type label, an industry type, and an industry attribute table. Target attribute values of the target entity identifier are obtained from a public database based on respective target attribute names in the target industry attribute table, to obtain a target attribute of the target entity identifier. A knowledge graph is constructed based on an entity corresponding to the target entity identifier, the industry type label of the target entity identifier, and the target attribute of the target entity identifier. The method according to the present disclosure may be adopted in such a manner to mine different entities within a plurality of domains (industries) and construct a cross-industry knowledge graph to establish a relation between entities in different industries.

In an applicable embodiment, the above step S13 of obtaining the target attribute values of the target entity identifier from the public database based on the respective target attribute names in the target industry attribute table, to obtain the target attributes of the target entity identifier includes the implementation steps of:

constructing a public database query link based on the target entity identifier; initiating a data query request to the public database based on the public database query link; obtaining web page source code returned by the public database in response to the data query request; and matching from the web page source code the target attribute values corresponding to the respective target attribute names in the target industry attribute table, based on a regular expression to obtain the target attributes of the target entity identifier.

Taking the movie "Movie XX" as an example, it is assumed that an identifier of the movie "Movie XX" is Q1234567. Then a query link to a public database A constructed based on the target entity's identifier Q1234567 may be, for example, https://aaa.ddd.ggg/Q1234567. Based on the link, a data query request is triggered to the public database A (via a browser), and then a web page returned by the public database A in response to the data query request is received, and web page source code for the web page is obtained. Further, the target attribute values corresponding to the respective target attribute names in the target industry attribute table, are matched from that web page source code based on a regular expression to obtain the target attributes of the target entity identifier.

Since the public database A is predefined with a unique QID for each field in the database, in the case where the fields stored in the public database have a one-to-one correspondence with the field codes, the step of matching the target attribute values corresponding to the respective target attribute names in the target industry attribute table, from that web page source code based on the regular expression to obtain the target attributes of the target entity identifier includes:

determining target field codes corresponding to the respective target attribute names in the target industry attribute table, based on field code definition rules of the public database; constructing the regular expression based on the target field codes; and extracting fields corresponding to the target field codes from the web page source code based on the regular expression to obtain the target attributes values.

Figure 2:
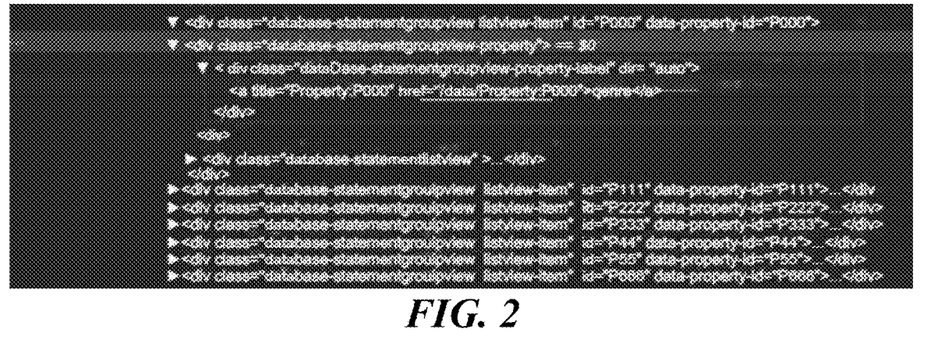
FIG. 2 illustrates a schematic diagram of web page source code according to an example embodiment of the present disclosure.

Taking FIG. 2 as an example for illustration, it is assumed that the web page source code of the movie "Movie XX" returned by the public database A is as shown in FIG. 2. It can be seen from the HTML shown in FIG. 2 that all attributes corresponding to the table are attributes of the entity Movie XX. Based on a regular expression constructed by the target field code, the target attribute values corresponding to the target field codes can be matched from the web page source code shown in FIG. 2. Assuming that the target field code is P111, the target attribute value corresponding to P111 obtained by matching is a value between code data-property-id="P111"> and </div> (not shown in FIG. 2).

In an applicable implementation, since the knowledge graph constructed by the method described above includes entities labeled by different industry type labels, the knowledge graph may be used in a cross-industry recommendation scenario to recommend to a user, who accessed to a first target entity during a predetermined historical time period, a second target entity with at least one same target attribute as the first target entity and with a different industry type label.

As an example, it is assumed that a user watched a superhero movie A by Company M this morning. A T-shirt with a pattern featuring elements of movie A may be recommended to the user when the user browses an apparel shopping platform in the afternoon.

It is possible that the knowledge graph may also be used in search engines, intelligent questioning and answering services, and other scenarios. For example, since some food programs have the target attribute of "food" and some restaurants also have the target attribute of "food", the cross-industry knowledge graph constructed by the above method according to the present disclosure may establish relations between food programs and restaurants. Thus, in a search scenario, if a user searches for a keyword "food program a", the user may be recommended with a relevant restaurant that is included in the food program a.

Optionally, in a particular implementation, the knowledge graph may be used for recommending, in a cross-industry recommendation scenario, to a user who accessed to a first target entity during a predetermined historical time period, a second target entity having at least one same target attribute as the first target entity and having a different industry type label includes:

obtaining a first target entity that has been accessed (commented on, forwarded, etc.) by a user in a historical window of time; determining, from the knowledge graph, a second target entity with at least one same target attribute (i.e., an entity that shares some of the target attributes) as the first target entity and with a different industry type label; and pushing relevant advertising information of the second target entity to the user when the user is in an application scenario corresponding to the second target entity.

The above method for knowledge graph construction according to the present disclosure may be applied in a terminal device or in a server.

Figure 3:
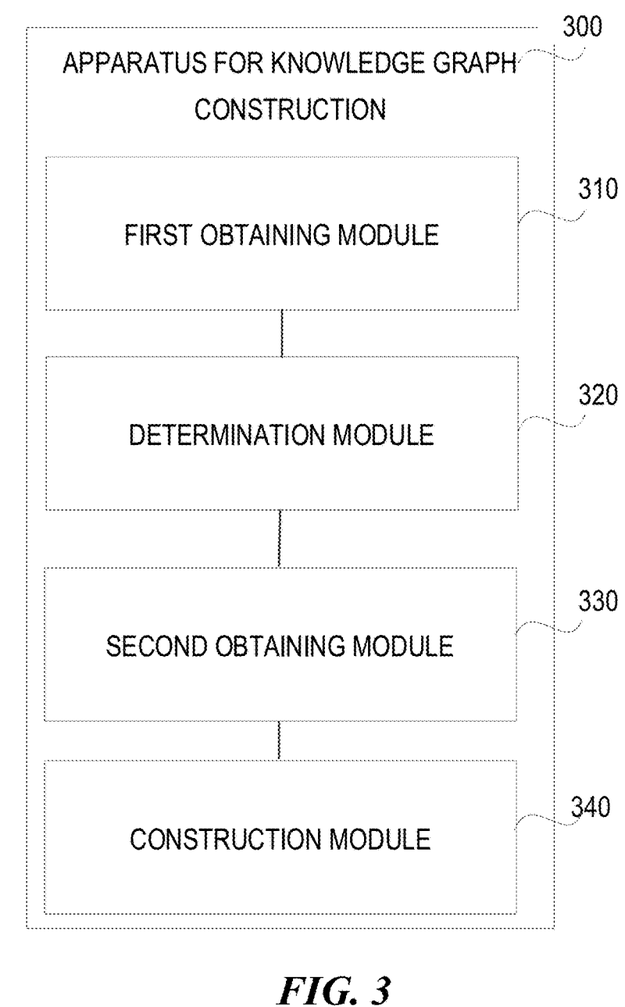
FIG. 3 illustrates a block diagram of a knowledge graph construction apparatus according to an example embodiment of the present disclosure.

Based on the same inventive conception, an embodiment of the present disclosure also provides a knowledge graph construction apparatus, as shown in FIG. 3. The knowledge graph construction apparatus 300 includes:

a first obtaining module 310 configured to obtain a target entity identifier and determine an industry type label corresponding to the target entity identifier; a determination module configured to determine a target industry attribute table based on a predetermined correspondence among the industry type label, an industry type, and an industry attribute table;

a second obtaining module 320 configured to obtain target attribute values of the target entity identifier from a public database based on respective target attribute names in the target industry attribute table, to obtain a target attribute of the target entity identifier, wherein the target attribute characterizes a key-value pair consisting of the target attribute name and the target attribute value; and a construction module 330 configured to construct a knowledge graph based on an entity characterized by the target entity identifier, the industry type label, and the target attribute.

In an applicable embodiment, the second obtaining module 330 comprises: a first constructing submodule configured to a public database query link based on the target entity identifier; initiating a data query request to the public database based on the public database query link; a first obtaining submodule configured to obtain web page source code returned by the public database as a response to the data query request; and a matching submodule configured to match, based on a regular expression, the target attribute values corresponding to the respective target attribute names in the target industry attribute table from the web page source code, to obtain the target attributes of the target entity identifier.

In an applicable embodiment, fields stored in the public database correspond to field codes one-to-one, and the matching submodule comprises: determining target field codes corresponding to the respective target attribute names in the target industry attribute table; constructing the regular expression based on the target field code; and extracting a field corresponding to the target field code from the web page source code according to the regular expression to obtain the target attributes values.

In an applicable embodiment, the first obtaining module 310 comprises: a searching submodule configured to obtain retrieved information related to the target entity identifier by searching for the target entity identifier through a search engine; an extracting submodule configured to extract a keyword from the retrieved information; and an inputting submodule configured to obtain the industry type label for the target entity identifier by inputting a feature representation of the keyword into an industry classification model.

In an applicable embodiment, the searching submodule is configured to: construct an access link to a target website based on the target entity identifier; and obtain a web page corresponding to the access link to the target website, and extracting the retrieved information from the web page.

In an applicable embodiment, the extracting submodule is configured to: extract text with each href attribute label from the retrieved information, and remove a stop word from the extracted text with the respective href attribute label, to obtain the keyword.

In an applicable embodiment, the knowledge graph comprises entities labeled by different industry type labels, and is used in a cross-industry recommendation scenario to recommend to a user, who accessed to a first target entity during a predetermined historical time period, a second target entity with at least one same target attribute as the first target entity and with a different industry type label.

By means of the above apparatus according to the present disclosure, a target entity identifier is obtained and an industry type label corresponding to the target entity identifier is determined. A target industry attribute table is determined based on a predetermined correspondence among the industry type label, an industry type, and an industry attribute table. Target attribute values of the target entity identifier are obtained from a public database based on respective target attribute names in the target industry attribute table, to obtain a target attribute of the target entity identifier. A knowledge graph is constructed based on an entity characterized by the target entity identifier, the industry type label of the target entity identifier, and the target attribute of the target entity identifier. The method according to the present disclosure may be adopted in such a manner to mine different entities within a plurality of domains (industries) and construct a cross-industry knowledge graph to establish a relation between entities in different industries.

The specific implementation steps for each of the modules in the above-described apparatus have been described in detail in the method embodiments relating to the apparatus and will not be repeated herein.

Figure 4:
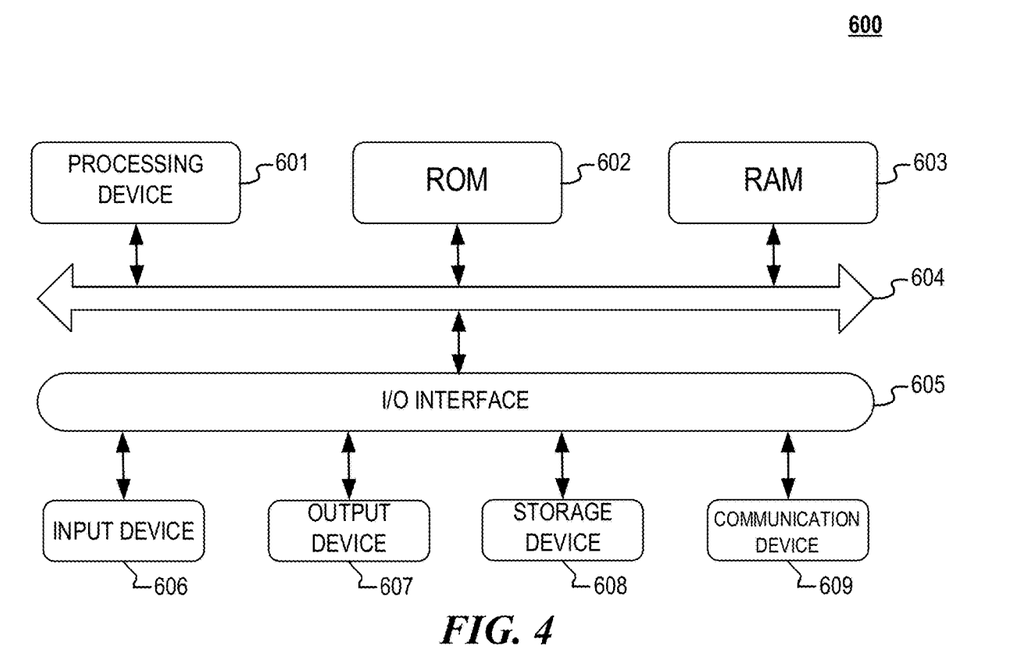
FIG. 4 illustrates a block diagram of an electronic device according to an example embodiment of the present disclosure.

Reference is made below to FIG. 4, which illustrates a schematic diagram of a structure of an electronic device 600 (e.g., a terminal, and a server) suitable for use in realizing the embodiments of the present disclosure. Terminal devices in the embodiments of the present disclosure may include, but are not limited to, mobile terminals such as mobile telephones, laptop computers, digital broadcast receivers, PDAs (personal digital assistants), PADs (tablet computers), PMPs (portable multimedia players), in-vehicle terminals (e.g., vehicle navigation terminals), and the like, and fixed terminals such as digital TVs, desktop computers, and the like. The electronic device illustrated in FIG. 4 is merely an example and should not impose any limitation on the functions and scope of use of the embodiments of the present disclosure.

As shown in FIG. 4, the electronic device 600 may include a processing device (e.g., a central processing device, a graphics processing device, etc.) 601, which may perform a variety of appropriate actions and processing according to a program stored in a read-only memory (ROM) 602 or a program loaded from a storage device 608 to a random access memory (RAM) 603. A variety of programs and data necessary for the operation of the electronic device 600 are also stored in the RAM 603. The processing device 601, the ROM 602 and the RAM 603 are connected to one another through a bus 604. An input/output (I/O) interface 605 is also connected to the bus 604.

In general, the following apparatuses may be connected to the I/O interface 605: an input device 606, such as a touch screen, a touch pad, a keyboard, a mouse, a camera, a microphone, an accelerometer, a gyroscope, etc.; an output device 607, such as a liquid crystal display (LCD), a speaker, a vibrator, etc.; a storage device 608, such as magnetic tape, a hard disk, etc.; and a communication device 609. The communication device 609 may allow the electronic device 600 to communicate with other devices in a wireless or wired way to exchange data. Although FIG. 4 shows the electronic device 600 having a plurality of devices, it should be understood that the electronic device 600 is not limited to implement or include all of the apparatuses shown. Alternatively, the electronic device 600 may implement or include more devices or fewer devices than those shown in the figure.

According to the embodiments of the present disclosure, the process described above with reference to the flowchart may be implemented as a computer software program. For example, the embodiments of the present disclosure include a computer program product comprising a computer program carried on a computer-readable medium. The computer program comprises program codes used for executing a method for recommendation of words. In such an embodiment, the computer program may be downloaded and installed from a network through the communication device 609, or installed from the storage device 608, or installed from the ROM 602. When the computer program is executed by the processing device 601, the above-mentioned functions defined in the method according to the embodiment of the present disclosure are executed.

It should be noted that the computer-readable storage medium mentioned above in the present disclosure may be a computer-readable signal medium or a computer-readable storage medium, or any combination of the two. The computer-readable storage medium may be, but not limited to, for example, an electrical, magnetic, optical, electromagnetic, infrared, or semiconductor-based system, apparatus or device, or any combination thereof. More specific examples of the computer-readable storage medium may include but are not limited to: an electrical connection having one or more conducting wires, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination thereof. In the present disclosure, the computer-readable storage medium may be any tangible medium that comprises or stores a program that may be used by or in combination with an instruction execution system, apparatus or device. In the present disclosure, the computer-readable signal medium may include a data signal propagated in a baseband or as a part of a carrier, which carries computer-readable program codes. Such a propagated data signal may be in multiple forms, including but not limited to an electromagnetic signal, an optical signal, or any suitable combination thereof. The computer-readable signal medium may also be any computer-readable medium other than a computer-readable storage medium; and the computer-readable signal medium may send, propagate or transmit a program that is used by or in combination with an instruction execution system, apparatus or device. The program codes that the computer-readable medium comprises may be transmitted by means of any suitable medium, including but not limited to: an electric wire, an optical cable, a radio frequency (RF), etc., or any suitable combination thereof. The computer-readable storage medium may be a non-transient computer-readable storage medium.

In some embodiments, a client and a server may communicate by means of any network protocol that is known at present or developed in the future, such as a hypertext transfer protocol (HTTP), and may be interconnected with digital data communication (e.g., a communication network) of any form or medium. Examples of the communication network include a local area network (LAN), a wide area network (WAN), an internetwork (e.g., the Internet) and an end-to-end network (e.g., an ad hoc end-to-end network), and any networks that are known at present or developed in the future.

The above-mentioned computer-readable medium may be contained in the above-mentioned electronic device, and may also exist independently without being installed in the electronic device.

The above-mentioned computer-readable medium carries one or more programs. When the one or more programs are executed by the electronic device, the electronic device is enabled to implement the following steps: obtaining a target entity identifier and determining an industry type label corresponding to the target entity identifier; determining a target industry attribute table based on a predetermined correspondence among the industry type label, an industry type, and an industry attribute table; obtaining target attribute values of the target entity identifier from a public database based on respective target attribute names in the target industry attribute table, to obtain a target attribute of the target entity identifier, wherein the target attribute characterizes a key-value pair consisting of the target attribute name and the target attribute value; and constructing a knowledge graph based on an entity characterized by the target entity identifier, the industry type label, and the target attribute.

Computer program codes for performing the operations of the present disclosure may be written in one or more programming languages or a combination thereof, including object-oriented programming languages such as Java, Smalltalk, C++, etc., and conventional procedural programming languages such as "C" or similar programming languages. The program codes may be executed completely on a user computer, partially on the user computer, as an independent software package, partially on the user computer and partially on a remote computer, or completely on a remote computer or server. In a case involving the remote computer, the remote computer may be connected to the user computer through any type of network, including a LAN or a WAN, or may be connected to an external computer (for example, through the Internet by using an Internet service provider).

The flowcharts and block diagrams in the accompanying drawings illustrate architectures, functions, and operations that may be realized in accordance with the systems, methods, and computer program products of various embodiments of the present disclosure. In this regard, each block in the flowchart or block diagram may represent a module, a program segment, or part of the codes, which comprises one or more executable instructions for implementing specified logical functions. It should also be noted that in some alternative implementations, functions indicated in the blocks may also be implemented in an order different from that indicated in the drawings. For example, two blocks represented in succession may be executed basically in parallel in fact, and sometimes they may also be executed in reverse order, depending on the function involved. It should also be noted that each block in the block diagram and/or flowchart, as well as a combination of the blocks in the block diagram and/or flowchart, may be implemented with a dedicated hardware-based system that executes a specified function or operation, or with a combination of dedicated hardware and computer instructions.

Modules described in the embodiments of the present disclosure may be implemented by means of software or hardware. The names of the units do not limit the units in some cases.

The functions described herein can be executed at least in part by one or more hardware logic components. For example, without limitation, example types of hardware logic components that may be used include: a field programmable gate array (FPGA), an application-specific integrated circuit (ASIC), an application-specific standard product (ASSP), a system-on-chip (SOC), a complex programmable logic device (CPLD), etc.

In the context of the present disclosure, a machine-readable medium may be a tangible medium that may comprise or store a program for use by or in combination with an instruction execution system, apparatus or device. The machine-readable storage medium may be a machine-readable signal medium or machine-readable storage medium. The machine-readable medium may be, but not limited to, an electronic, magnetic, optical, electromagnetic, infrared, or semiconductor-based system, apparatus or device, or any combination thereof. More specific examples of the machine-readable storage medium may include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination of the foregoing.

According to one or more embodiments of the present disclosure, Example 1 provides a method for knowledge graph construction, comprising: obtaining a target entity identifier and determining an industry type label corresponding to the target entity identifier; determining a target industry attribute table based on a predetermined correspondence among the industry type label, an industry type, and an industry attribute table; obtaining target attribute values of the target entity identifier from a public database based on respective target attribute names in the target industry attribute table, to obtain a target attribute of the target entity identifier, wherein the target attribute characterizes a key-value pair consisting of the target attribute name and the target attribute value; and constructing a knowledge graph based on an entity characterized by the target entity identifier, the industry type label, and the target attribute.

According to one or more embodiments of the present disclosure, Example 2 provides the method of Example 1, the obtaining the target attribute values of the target entity identifier from the public database based on the respective target attribute names in the target industry attribute table, to obtain the target attributes of the target entity identifier comprises: constructing a public database query link based on the target entity identifier; initiating a data query request to the public database based on the public database query link; obtaining web page source code returned by the public database as a response to the data query request; and matching, based on a regular expression, the target attribute values corresponding to the respective target attribute names in the target industry attribute table from the web page source code, to obtain the target attributes of the target entity identifier.

According to one or more embodiments of the present disclosure, Example 3 provides the method of Example 2, fields stored in the public database correspond to field codes one-to-one, and wherein matching, based on a regular expression, the target attribute values corresponding to the respective target attribute names in the target industry attribute table from the web page source code, to obtain the target attributes of the target entity identifier comprises: determining target field codes corresponding to the respective target attribute names in the target industry attribute table; constructing the regular expression based on the target field code; and extracting a field corresponding to the target field code from the web page source code according to the regular expression to obtain the target attributes values.

According to one or more embodiments of the present disclosure, Example 4 provides the method of Example 1, determining the industry type label corresponding to the target entity identifier comprises: obtaining retrieved information related to the target entity identifier by searching for the target entity identifier through a search engine; extracting a keyword from the retrieved information; and obtaining the industry type label for the target entity identifier by inputting a feature representation of the keyword into an industry classification model.

According to one or more embodiments of the present disclosure, Example 5 provides the method of Example 4, obtaining the retrieved information related to the target entity identifier by searching for the target entity identifier through the search engine comprises: constructing an access link to a target website based on the target entity identifier; and obtaining a web page corresponding to the access link to the target website, and extracting the retrieved information from the web page.

According to one or more embodiments of the present disclosure, Example 6 provides the method of Example 4, the extracting the keyword from the retrieved information comprises: extracting text with each href attribute label from the retrieved information, and removing a stop word from the extracted text with the respective href attribute label, to obtain the keyword.

According to one or more embodiments of the present disclosure, Example 7 provides the method of Examples 1-6, the knowledge graph comprises entities labeled by different industry type labels, and is used in a cross-industry recommendation scenario to recommend to a user, who accessed to a first target entity during a predetermined historical time period, a second target entity with at least one same target attribute as the first target entity and with a different industry type label.

According to one or more embodiments of the present disclosure, Example 8 provides an apparatus for knowledge graph construction, comprising: a first obtaining module configured to obtain a target entity identifier and determine an industry type label corresponding to the target entity identifier; a determination module configured to determine a target industry attribute table based on a predetermined correspondence among the industry type label, an industry type, and an industry attribute table; a second obtaining module configured to obtain target attribute values of the target entity identifier from a public database based on respective target attribute names in the target industry attribute table, to obtain a target attribute of the target entity identifier, wherein the target attribute characterizes a key-value pair consisting of the target attribute name and the target attribute value; and a construction module configured to construct a knowledge graph based on an entity characterized by the target entity identifier, the industry type label, and the target attribute.

According to one or more embodiments of the present disclosure, Example 9 provides the apparatus of Example 8, the second obtaining module comprises: a first constructing submodule configured to a public database query link based on the target entity identifier; initiating a data query request to the public database based on the public database query link; a first obtaining submodule configured to obtain web page source code returned by the public database as a response to the data query request; and a matching submodule configured to match, based on a regular expression, the target attribute values corresponding to the respective target attribute names in the target industry attribute table from the web page source code, to obtain the target attributes of the target entity identifier.

According to one or more embodiments of the present disclosure, Example 10 provides the apparatus of Example 9, fields stored in the public database correspond to field codes one-to-one, and the matching submodule comprises: determining target field codes corresponding to the respective target attribute names in the target industry attribute table; constructing the regular expression based on the target field code; and extracting a field corresponding to the target field code from the web page source code according to the regular expression to obtain the target attributes values.

According to one or more embodiments of the present disclosure, Example 11 provides the apparatus of Example 8, the first obtaining module comprises: a searching submodule configured to obtain retrieved information related to the target entity identifier by searching for the target entity identifier through a search engine; an extracting submodule configured to extract a keyword from the retrieved information; and an inputting submodule configured to obtain the industry type label for the target entity identifier by inputting a feature representation of the keyword into an industry classification model.

According to one or more embodiments of the present disclosure, Example 12 provides the apparatus of Example 11, the searching submodule is configured to: construct an access link to a target website based on the target entity identifier; and obtain a web page corresponding to the access link to the target website, and extracting the retrieved information from the web page.

According to one or more embodiments of the present disclosure, Example 13 provides the apparatus of Example 11, the extracting submodule is configured to: extract text with each href attribute label from the retrieved information, and remove a stop word from the extracted text with the respective href attribute label, to obtain the keyword.

According to one or more embodiments of the present disclosure, Example 14 provides the apparatus of Examples 8-13, the knowledge graph comprises entities labeled by different industry type labels, and is used in a cross-industry recommendation scenario to recommend to a user, who accessed to a first target entity during a predetermined historical time period, a second target entity with at least one same target attribute as the first target entity and with a different industry type label.

The above description is only a preferred embodiment of the present disclosure and an illustration of the technical principles utilized. It should be understood by those skilled in the art that the scope of disclosure involved in the present disclosure is not limited to technical solutions formed by a particular combination of the above technical features, but also covers other technical solutions formed by any combination of the above technical features or their equivalent features without departing from the above disclosed concept, for example, a technical solution formed by interchanging the above features with (but not limited to) technical features with similar functions disclosed in the present disclosure.

Furthermore, while the operations are depicted using a particular order, this should not be construed as requiring that the operations be performed in the particular order shown or in sequential order of execution. Multitasking and parallel processing may be advantageous in certain environments. Similarly, while several specific implementation details are included in the above discussion, these should not be construed as limiting the scope of the present disclosure. Certain features described in the context of separate embodiments may also be implemented in combination in a single embodiment. Conversely, various features described in the context of a single embodiment may also be implemented in multiple embodiments, either individually or in any suitable sub-combination.

Although the present subject matter has been described using language specific to structural features and/or method logical actions, it should be understood that the subject matter limited in the appended claims is not necessarily limited to the particular features or actions described above. Rather, the particular features and actions described above are merely example forms of implementing the claims. With respect to the apparatus in the above embodiments, the specific manner in which the individual modules perform the operations has been described in detail in the embodiments relating to the method, and will not be described in detail herein.

We claim:

1. A method for knowledge graph construction, comprising:
   construction, by an electronic device, a knowledge graph;
   determining, by the electronic device, a second target entity based on a first target entity accessed by a user and the knowledge graph, the second target entity being with at least one same target attribute as the first entity and with a second industry type label different from a first industry type label of the first target entity; and
   providing, by the electronic device, information of the second target entity to the user,
   wherein the knowledge graph is constructed by:
      obtaining a target entity identifier and determining an industry type label corresponding to the target entity identifier;
      determining a target industry attribute table based on a predetermined correspondence among the industry type label, an industry type, and an industry attribute table;
      obtaining target attribute values of the target entity identifier from a public database based on respective target attribute names in the target industry attribute table, to obtain a target attribute of the target entity identifier, wherein the target attribute characterizes a key-value pair consisting of the target attribute name and the target attribute value; and
      constructing the knowledge graph based on an entity characterized by the target entity identifier, the industry type label, and the target attribute,
   wherein the obtaining the target attribute values of the target entity identifier from the public database based on the respective target attribute names in the target industry attribute table, to obtain the target attributes of the target entity identifier comprises:
      constructing a public database query link based on the target entity identifier;
      initiating a data query request to the public database based on the public database query link;
      obtaining web page source code returned by the public database as a response to the data query request; and
      matching, based on a regular expression, the target attribute values corresponding to the respective target attribute names in the target industry attribute table from the web page source code, to obtain the target attributes of the target entity identifier.

2. The method of claim 1, wherein fields stored in the public database correspond to field codes one-to-one, and wherein matching, based on a regular expression, the target attribute values corresponding to the respective target attribute names in the target industry attribute table from the web page source code, to obtain the target attributes of the target entity identifier comprises:
   determining target field codes corresponding to the respective target attribute names in the target industry attribute table;

constructing the regular expression based on the target field code; and
extracting a field corresponding to the target field code from the web page source code according to the regular expression to obtain the target attributes values.

3. The method of claim 1, wherein determining the industry type label corresponding to the target entity identifier comprises:
obtaining retrieved information related to the target entity identifier by searching for the target entity identifier through a search engine;
extracting a keyword from the retrieved information; and
obtaining the industry type label for the target entity identifier by inputting a feature representation of the keyword into an industry classification model.

4. The method of claim 3, wherein obtaining the retrieved information related to the target entity identifier by searching for the target entity identifier through the search engine comprises:
constructing an access link to a target website based on the target entity identifier; and
obtaining a web page corresponding to the access link to the target website, and extracting the retrieved information from the web page.

5. The method of claim 3, wherein the extracting the keyword from the retrieved information comprises:
extracting text with each href attribute label from the retrieved information, and removing a stop word from the extracted text with the respective href attribute label, to obtain the keyword.

6. The method of claim 1, wherein the knowledge graph comprises entities labeled by different industry type labels, and is used in a cross-industry recommendation scenario to recommend the second target entity to the user who accessed to the first target entity during a predetermined historical time period.

7. An electronic device, comprising:
a storage device with a computer program stored thereon; and
a processor configured to execute the computer program in the storage device to perform acts comprising:
construction, by an electronic device, a knowledge graph;
determining, by the electronic device, a second target entity based on a first target entity accessed by a user and the knowledge graph, the second target entity being with at least one same target attribute as the first entity and with a second industry type label different from a first industry type label of the first target entity; and
providing, by the electronic device, information of the second target entity to the user,
wherein the knowledge graph is constructed by:
obtaining a target entity identifier and determining an industry type label corresponding to the target entity identifier;
determining a target industry attribute table based on a predetermined correspondence among the industry type label, an industry type, and an industry attribute table;
obtaining target attribute values of the target entity identifier from a public database based on respective target attribute names in the target industry attribute table, to obtain a target attribute of the target entity identifier, wherein the target attribute characterizes a key-value pair consisting of the target attribute name and the target attribute value; and
constructing the knowledge graph based on an entity characterized by the target entity identifier, the industry type label, and the target attribute,
wherein the obtaining the target attribute values of the target entity identifier from the public database based on the respective target attribute names in the target industry attribute table, to obtain the target attributes of the target entity identifier comprises:
constructing a public database query link based on the target entity identifier;
initiating a data query request to the public database based on the public database query link;
obtaining web page source code returned by the public database as a response to the data query request; and
matching, based on a regular expression, the target attribute values corresponding to the respective target attribute names in the target industry attribute table from the web page source code, to obtain the target attributes of the target entity identifier.

8. The electronic device of claim 7, wherein fields stored in the public database correspond to field codes one-to-one, and wherein matching, based on a regular expression, the target attribute values corresponding to the respective target attribute names in the target industry attribute table from the web page source code, to obtain the target attributes of the target entity identifier comprises:
determining target field codes corresponding to the respective target attribute names in the target industry attribute table;
constructing the regular expression based on the target field code; and
extracting a field corresponding to the target field code from the web page source code according to the regular expression to obtain the target attributes values.

9. The electronic device of claim 7, wherein determining the industry type label corresponding to the target entity identifier comprises:
obtaining retrieved information related to the target entity identifier by searching for the target entity identifier through a search engine;
extracting a keyword from the retrieved information; and
obtaining the industry type label for the target entity identifier by inputting a feature representation of the keyword into an industry classification model.

10. The electronic device of claim 9, wherein obtaining the retrieved information related to the target entity identifier by searching for the target entity identifier through the search engine comprises:
constructing an access link to a target website based on the target entity identifier; and
obtaining a web page corresponding to the access link to the target website, and extracting the retrieved information from the web page.

11. The electronic device of claim 9, wherein the extracting the keyword from the retrieved information comprises:
extracting text with each href attribute label from the retrieved information, and removing a stop word from the extracted text with the respective href attribute label, to obtain the keyword.

12. The electronic device of claim 7, wherein the knowledge graph comprises entities labeled by different industry type labels, and is used in a cross-industry recommendation scenario to recommend the second target entity to the user who accessed to the first target entity during a predetermined historical time period.

13. A non-transitory computer-readable medium having a computer program stored thereon which, when executed by a processing device, performs acts comprising:
  construction, by an electronic device, a knowledge graph;
  determining, by the electronic device, a second target entity based on a first target entity accessed by a user and the knowledge graph, the second target entity being with at least one same target attribute as the first entity and with a second industry type label different from a first industry type label of the first target entity; and
  providing, by the electronic device, information of the second target entity to the user,
  wherein the knowledge graph is constructed by:
    obtaining a target entity identifier and determining an industry type label corresponding to the target entity identifier;
    determining a target industry attribute table based on a predetermined correspondence among the industry type label, an industry type, and an industry attribute table;
    obtaining target attribute values of the target entity identifier from a public database based on respective target attribute names in the target industry attribute table, to obtain a target attribute of the target entity identifier, wherein the target attribute characterizes a key-value pair consisting of the target attribute name and the target attribute value; and
    constructing the knowledge graph based on an entity characterized by the target entity identifier, the industry type label, and the target attribute,
  wherein the obtaining the target attribute values of the target entity identifier from the public database based on the respective target attribute names in the target industry attribute table, to obtain the target attributes of the target entity identifier comprises:
    constructing a public database query link based on the target entity identifier;
    initiating a data query request to the public database based on the public database query link;
    obtaining web page source code returned by the public database as a response to the data query request; and
    matching, based on a regular expression, the target attribute values corresponding to the respective target attribute names in the target industry attribute table from the web page source code, to obtain the target entity attributes of the target entity identifier.

14. The non-transitory computer-readable medium of claim 13, wherein fields stored in the public database correspond to field codes one-to-one, and wherein matching, based on a regular expression, the target attribute values corresponding to the respective target attribute names in the target industry attribute table from the web page source code, to obtain the target attributes of the target entity identifier comprises:
  determining target field codes corresponding to the respective target attribute names in the target industry attribute table;
  constructing the regular expression based on the target field code; and
  extracting a field corresponding to the target field code from the web page source code according to the regular expression to obtain the target attributes values.

15. The non-transitory computer-readable medium of claim 13, wherein determining the industry type label corresponding to the target entity identifier comprises:
  obtaining retrieved information related to the target entity identifier by searching for the target entity identifier through a search engine;
  extracting a keyword from the retrieved information; and
  obtaining the industry type label for the target entity identifier by inputting a feature representation of the keyword into an industry classification model.

16. The non-transitory computer-readable medium of claim 15, wherein obtaining the retrieved information related to the target entity identifier by searching for the target entity identifier through the search engine comprises:
  constructing an access link to a target website based on the target entity identifier; and
  obtaining a web page corresponding to the access link to the target website, and extracting the retrieved information from the web page.

17. The non-transitory computer-readable medium of claim 15, wherein the extracting the keyword from the retrieved information comprises:
  extracting text with each href attribute label from the retrieved information, and removing a stop word from the extracted text with the respective href attribute label, to obtain the keyword.

* * * * *